United States Patent [19]

Krause et al.

[11] 4,268,187
[45] May 19, 1981

[54] DRAG-TYPE SPREADING APPARATUS FOR ROAD CONSTRUCTION MIXTURES

[76] Inventors: Ulrich Krause, Prinz Christianweg 13; Peter Krause, Park Rosenhoehe 4, both of 61 Darmstadt, Fed. Rep. of Germany

[21] Appl. No.: 955,622

[22] Filed: Oct. 27, 1978

[30] Foreign Application Priority Data

Nov. 7, 1977 [AT] Austria .................................. 7949/77

[51] Int. Cl.³ ............................................. E01C 19/22
[52] U.S. Cl. .................................... 404/118; 172/119; 172/199
[58] Field of Search ............... 404/118, 119, 101, 105; 172/787, 786, 71, 72, 393, 119, 63, 199, 200; 37/29, 32, 35, 38

[56] References Cited

U.S. PATENT DOCUMENTS

| | | | |
|---|---|---|---|
| 1,037,194 | 9/1912 | Berger | 172/199 |
| 1,093,814 | 4/1914 | Whittemore | 172/199 |
| 1,260,800 | 3/1918 | Porter | 172/199 X |
| 1,332,502 | 3/1920 | Kirkpatrick | 172/199 X |
| 1,799,424 | 4/1931 | Jersey | 172/199 |
| 1,802,087 | 4/1931 | McConnaughay | 404/101 X |
| 1,833,878 | 11/1931 | Adams | 404/118 X |
| 3,091,873 | 6/1963 | West | 172/119 X |
| 3,739,859 | 6/1973 | White | 172/393 X |
| 3,861,475 | 1/1975 | Kuncewicz | 172/71 |
| 3,876,013 | 4/1975 | Dunn | 172/71 |

Primary Examiner—Nile C. Byers, Jr.
Attorney, Agent, or Firm—W. G. Fasse; D. F. Gould

[57] ABSTRACT

The present spreading apparatus for road construction mixtures, such as bituminous cold mixtures, has at least two V- or U-shaped screeding structures or screeds one leading and the other trailing with respect to the working direction. The leading screed extends tandemly, partially into the angle formed by the trailing screed. The leading screed structure has a worm type conveyor connected parallel to each wall of the V- or U-shaped screed. The worm type conveyor assures the homogenity of the road construction mixture and reduces the inherent pressure of the mixture against the leveling elements. Both the leading and the trailing screed are adjustably inclined away from the working direction. The adjustment of the screed position may be made, for example, by a spindle with a hand wheel.

3 Claims, 3 Drawing Figures

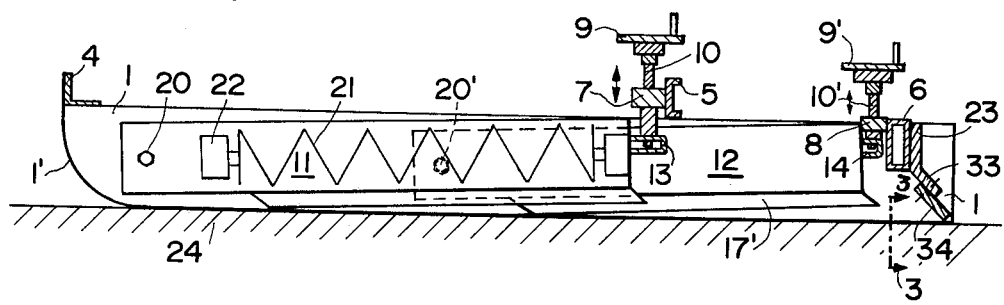
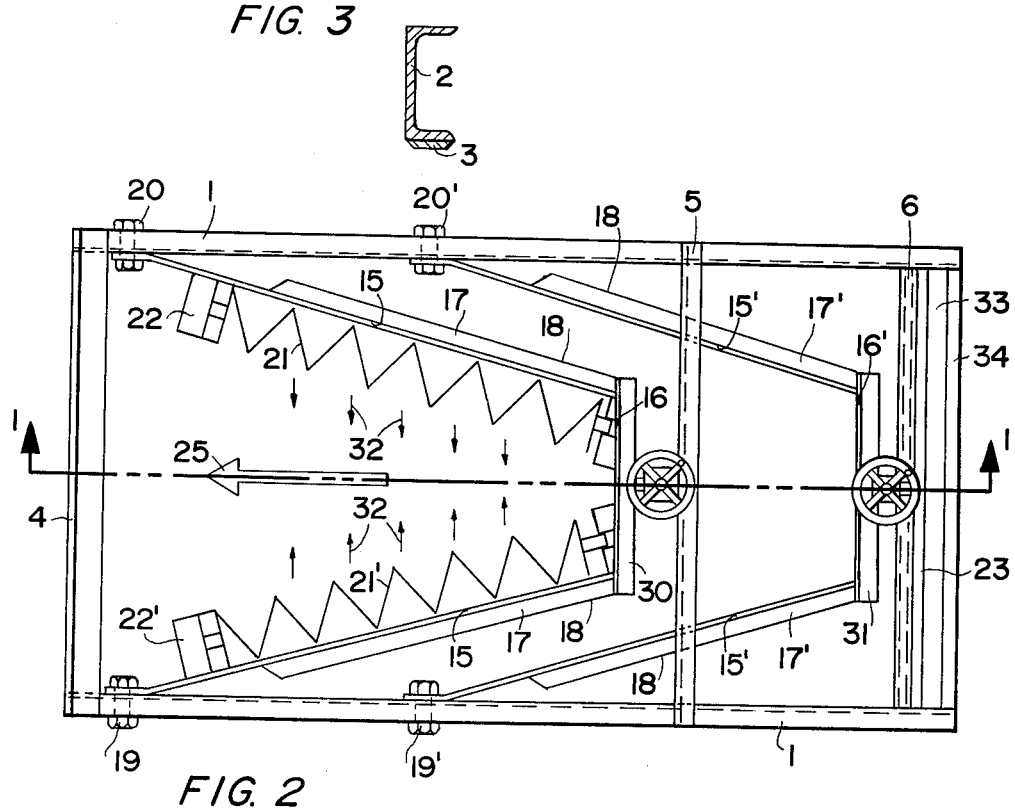

DRAG-TYPE SPREADING APPARATUS FOR ROAD CONSTRUCTION MIXTURES

BACKGROUND OF THE INVENTION

The invention relates to a drag-type spreading apparatus for placing road construction mixtures, in particular bituminous cold mixtures, into depressions in a road surface, for example, in grooves in the lanes of a road surface. The drag-type spreading apparatus will hereafter be called spreader. The spreader has two skids rigidly connected a distance apart and extending in parallel to the working direction which is the advance direction of the spreader as the latter is pushed or pulled along the road by a suitable vehicle such as a tractor or bulldozer. The spreader also has a position adjustable screeding structure with a suitable configuration which opens in the working direction. The screeding structure includes a portion which inclines away from the working direction and the slope of the inclination is adjustable.

Such a spreader is described in the German Patent Publication No. 2,534,386. The known spreader has a screed, the ends of which face in the working direction and are pivotally mounted to the skids by means of coaxially arranged bolts. The known screed is adjustable relative to a cross beam connecting the skids.

The advantage of such a configuration is seen in that only a height adjusting means is required for an angular positioning of the screeding structure relative to the road surface. Hence, a quick adaptation to changing road construction requirements is possible.

Spreaders of this type are mainly used for placing or installing of bituminous cold materials, such as slurries or the like, particularly in track grooves in the lanes. Consequently, a more or less strongly distinct sorting of the mineral components of the material mixture occurs directly beneath the leveling plank. The mineral components are sorted from the edges toward the middle, ranging from fine to coarse, whereby the sorting is dependent on the depth of the groove.

Such a sorting is not only desired, rather, in view of the expected stability of the installed filler, it is required. The maintaining of a homogeneous condition of the mixture material in the spreader, however, is a prerequisite for such prior art approach. However, such homogeneous condition is very often not given, and a material which has already been separated cannot be sorted by such an apparatus.

The cold mixture material is very often a rather flowable material. In view of this, a negative effect of the pressure caused by the material in front of and in contact with the screeding structure may not always be positively avoided, especially in instances where grooves or holes of substantial depth must be filled. Thus, heretofore, the grooves in the lane are often overfilled and the excess material impairs the evenness of the repaired road surface.

OBJECTS OF THE INVENTION

In view of the above it is the aim of the invention to achieve the following objects singly or in combination:

to provide a drag-type spreading apparatus, particularly for placing bituminous cold mixtures into grooves in road surfaces, which avoids the disadvantages of the prior art spreading devices;

to provide a spreading apparatus which assures the homogenity of the material that is being spread;

to provide a spreading apparatus which reduces the inherent pressure of the material mixture in the area where the material passes into the grooves or holes; and to construct a spreading apparatus which provides additional packing and leveling of the poured material by means of a second screeding device arranged in series with a first screeding device.

SUMMARY OF THE INVENTION

The drag-type spreading apparatus of the present invention has at least two screeding structures arranged in series between glide runners or skids. Two worm conveyors are arranged in the forward screeding structure as viewed in the advancing or working direction. The worms convey the mixture in the working direction and are arranged in parallel to the inner sides of the lateral screed wall portions which form a V- or U-configuration. The worms are driven in opposite directions and rotate inwardly relative to a longitudinal center line of the apparatus. The two screeding structures are arranged between the skids in tandem so that the V- or U-configuration open in the working direction. The screeding structures, particularly rear screeding means, are adjustably inclined relative to the surface on which they slide and in a direction opposite to the working direction. As a result, the material emerging rearwardly from the forward screeding structure, as viewed in the working direction, is additionally packed by the second screeding structure which further smoothens the installed surface.

The effect of the overflow of smaller amounts of excess mixture material from the first screeding structure to the second screeding structure may be substantially compensated by means of an appropriate correction of the angle of inclination of the second screeding structure with respect to the first screeding structure.

Furthermore, the material mixture is maintained in a homogeneous distribution until immediately prior to passing of the mixture into the installed position. This is accomplished by the worm conveyors arranged in the space between and parallel to the lateral screeding walls. The rotation of the worms or rather their conveying action toward the middle, away from the lateral screeding walls reduces the inherent pressure of the mixture material immediately prior to its passage under the rear screeding means, the so-called screeding beam whereby an overflow of excess material from the forward screeding structure to the trailing screed is avoided, at least substantially.

BRIEF FIGURE DESCRIPTION

In order that the invention may be clearly understood it will now be described by way of example, with reference to the accompanying drawings, wherein:

FIG. 1 illustrates a partial sectional view through the drag-type spreading apparatus of FIG. 2 along a sectional plane indicated by section line 1—1 in FIG. 2;

FIG. 2 illustrates a top view of the spreading apparatus according to the invention; and FIG. 3 illustrates a glide runner section along the section line 3—3 in FIG. 1.

DETAILED DESCRIPTION OF PREFERRED EXAMPLE EMBODIMENTS ILLUSTRATING THE BEST MODE OF THE PRESENT INVENTION

FIG. 3 shows that the glide runners or skids 1 of a drag-type spreader are formed by C-shaped steel beams 2 provided with replaceable wear surfaces 3, for example made of hardened steel.

FIG. 2 shows a top plan view of the present apparatus wherein the skids 1 are connected to one another at the front and rear end looking in the working direction 25 along the road surface 24. The rounded front ends 1' of the skids are interconnected by an angular L-beam 4. A C-shaped beam 5 is attached to the top sides of the skids 1. A box shaped beam 6 is arranged between the C-shaped steel beams 2. The box shaped beam 6 may be formed, for example, by welding two C-shaped sections together. The beams and skids may all be welded together to form a frame.

Spindle nuts 7 and 8 are rigidly connected to the beam 5 and to the box shaped beam 6, respectively. The respective spindles 10, 10' are equipped with hand wheels 9, 9' and are threaded through the spindle nuts 7 and 8. One end of a fork head 13 or 14 having an elongated hole is connected to the spindles 10, 10'. The other end of the fork heads 13 and 14 is connected to pivotally mounted screeding structures or screeds 11 and 12, respectively. The screed 11 is the leading screed with respect to the working direction indicated by the arrow 25, and the screed 12 is the trailing screed. Each screeding structure 11, 12 comprises two lateral side walls 15, 15' and a rear screeding beam 16, 16' forming a V- or U-shaped configuration as shown in FIG. 2. Thus, the leading screed 11 may extend tandemly into the trailing screed 12. The screed walls 15, 15' respectively are inclined at an angle of between 20° and 30° relative to the skids 1. The rear beams or real walls 16, 16' interconnect the rear ends of the lateral walls 15, 15'. The lower edge of the screed walls 15, 15' and of the rear cross walls 16, 16' is inclined outwardly at an angle of approximately 45° with respect to the road surface 24 and form so-called screeding blades 17, 17', 30, and 31. These screeding blades 17, 17', 30, 31 are equipped with replaceable contact surfaces 18, 18' which are adjustable and wear resistant. The pivotally mounted screeds 11 and 12 are bent parallel to the skids 1 where each screed 11 and 12 is connected to the skids 1 by means of two bolts 19 and 20 and 19' and 20' respectively. The bolts 19, 19' and 20, 20' are axially aligned respectively.

The angle of inclination of the screeding structures 11 and 12 which slope relative to the working direction 25 is set or adjusted by means of the spindle nuts 7 and 8 and the spindles 10, 10'.

The material input occurs in the area between the side walls of the leading screeding structure 11. Two worm type conveyors or worms 21, 21' are arranged along the screeding walls 15, 15' of the leading screeding structure 11. The worms 21, 21' are constructed so that they advance material substantially in the working direction 25 and with a component away from the walls 15 and into the inner space between the walls 15 as indicated by the arrows 32. The r.p.m. of the worm type conveyors 21, 21' may be adjustably controlled, for example, by means of oil-hydraulic motors 22 and 22' mounted on screed walls 15.

A leveling plank 23 is secured to the rear end of the present spreading apparatus, for example by bolts, not shown, screwing the plank 23 to the beam 6. The plank 23 has an inclined lower edge 33 to which there is attached, preferably in an exchangeable manner, a screeding bar 34, preferably made of wear resistant material such as hardened steel. The elevational position of the plank 23 may be adjustable, for example, by placing said bolts into different holes vertically aligned in the rear side wall of the beam 6.

Although the invention has been described with reference to specific example embodiments, it is to be understood that it is intended to cover all modifications and equivalents within the scope of the appended claims.

What is claimed is:

1. A drag-type spreading apparatus for placing road mixtures in a road surface by advancing the apparatus in a working direction, comprising skid means extending substantially in parallel to the working direction, frame means including connecting means rigidly connecting and spacing said skid means to said frame means, said apparatus further comprising screeding means, securing means operatively attaching said screeding means to said frame means whereby said screeding means are adjustable, said screeding means comprising first and second screeding members each with screeding wall means including lateral screeding wall means and rear screeding wall means forming a configuration opening in the working direction, first and second worm type conveyor means operatively connected to and extending in parallel to the respective one of said lateral screeding wall means of at least one of said screeding members, and drive means operatively connected to said first and second worm type conveyor means for rotating said first and second worm type conveyor means in opposite directions, said first and second worm type conveyor means being constructed to have a feed direction (32) inwardly away from said screeding wall means (15), whereby said first and second worm type conveyor means advance said road mixture in the working direction and inwardly away from said lateral screeding wall means to reduce the pressure of the road mixture at the gap between the road surface and the lower edge of the screeding wall means where the road mixture passes into grooves or holes in the road surface.

2. The apparatus of claim 1, wherein said first screeding member is arranged ahead of and in tandem with the second screeding member as viewed in said working direction, and wherein said first screeding member extends into said configuration of said second screeding member.

3. The apparatus of claim 1, wherein said drive means comprise speed adjusting means for adjusting the r.p.m.

* * * * *